US007240357B1

(12) United States Patent
Arsenault et al.

(10) Patent No.: US 7,240,357 B1
(45) Date of Patent: Jul. 3, 2007

(54) SIMULTANEOUS TUNING OF MULTIPLE SATELLITE FREQUENCIES

(75) Inventors: Robert George Arsenault, Redondo Beach, CA (US); Laura Johnson O'Donnell, El Segundo, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1165 days.

(21) Appl. No.: 09/870,323

(22) Filed: May 30, 2001

(51) Int. Cl.
*H04N 7/20* (2006.01)

(52) U.S. Cl. .............................. 725/68; 725/63; 725/69; 725/70; 348/725; 348/731; 455/3.02

(58) Field of Classification Search .............. 455/3.01, 455/3.02, 3.06, 131, 132, 277.1; 725/63, 725/67, 68–71, 131, 139, 151; 348/725, 348/726, 731
See application file for complete search history.

(56) References Cited

U.S. PATENT DOCUMENTS

| | | | | |
|---|---|---|---|---|
| 4,675,732 | A * | 6/1987 | Oleson | 725/71 |
| 5,029,232 | A * | 7/1991 | Nall | 725/68 |
| 5,461,427 | A * | 10/1995 | Duffield et al. | 348/555 |
| 5,787,335 | A * | 7/1998 | Novak | 725/69 |
| 5,959,592 | A | 9/1999 | Petruzzelli | |
| 6,023,603 | A | 2/2000 | Matsubara | |
| 6,434,747 | B1 * | 8/2002 | Khoo et al. | 725/46 |
| 6,810,413 | B1 * | 10/2004 | Rajakarunanayake et al. | 709/203 |
| 6,922,844 | B1 * | 7/2005 | Arsenault et al. | 725/54 |
| 7,039,937 | B1 * | 5/2006 | Glenn | 725/68 |
| 7,043,750 | B2 * | 5/2006 | Ina | 725/131 |
| 2001/0037512 | A1 * | 11/2001 | Flickner et al. | 725/131 |

* cited by examiner

*Primary Examiner*—Ngoc Vu
(74) *Attorney, Agent, or Firm*—Georgann S. Grunebach

(57) ABSTRACT

A system and method for receiving services is presented. The system comprises a first splitter having an input, a first output and a slaved output receiving a first signal at the input having a single polarization including a first service and a slaved service, wherein the first signal is directed to the first output and the slaved output and selected by a first control signal applied at the input, a first tuner receiving the first output and tuning the first service and a slaved tuner receiving the slaved output and tuning the slaved service. The method comprises generating a first control signal to select a first signal, receiving a first signal including a first service and a slaved service, wherein the first service and the slaved service are at the same polarization, splitting the first signal with a first splitter to a first output and a first slaved output, tuning the first service from the first output with a first tuner and tuning the slaved service from the slaved output with a slaved tuner.

92 Claims, 7 Drawing Sheets

| Service | Satellite 1 | | | | | | Satellite 2 | | | | | |
|---|---|---|---|---|---|---|---|---|---|---|---|---|
| | LHCP | | | RHCP | | | LHCP | | | RHCP | | |
| | kbps | transponder | SCID | kbps | transponder | SCID | kbps | transponder | SCID | kbps | transponder | SCID |
| A | 5 | 2 | 90 | 50 | 1 | 60 | 100 | 6 | 100 | 1000 | 5 | 90 |
| B | 10 | 2 | 91 | 100 | 1 | 61 | 200 | 6 | 101 | 2000 | 5 | 91 |
| C | 10 | 10 | 90 | 100 | 13 | 99 | 200 | 16 | 100 | 2000 | 7 | 100 |
| D | 10 | 14 | 100 | 100 | 17 | 99 | 200 | 26 | 100 | 2000 | 9 | 100 |

*FIG. 5*

☐ Services for Primary Tuner(s)
▓ Secondary Services for Slaved Tuner

*FIG. 6A*

▨ Service A
▧ Service B
☐ Service C

*FIG. 6B*

SIMULTANEOUS TUNING OF MULTIPLE SATELLITE FREQUENCIES

BACKGROUND OF THE INVENTION

1. Field of the Invention

The present invention relates generally to systems for transmitting services, and in particular, to systems for broadcasting multiple services to subscribers via satellite.

2. Description of the Related Art

Conventional direct broadcast satellite (DBS) systems broadcast signals including a range of different channels over a wide coverage region. The signals are then received by users with an antenna having a low noise block converter (LNB) and communicated to an integrated receiver/decoder (IRD) which receives and decodes the channels based upon user selections or other criteria. In such conventional systems the broadcaster sends most channels or services on one frequency and tunes each of these services independently. Additionally, services which must be continuously monitored and/or acquired, are typically sent on all frequencies and received in conjunction with other services.

To expand such systems to provide additional services that must be continuously monitored and/or acquired, while maintaining compatibility with legacy equipment, would normally require simply appending the new services on all frequencies as the existing services. However, such a system and method quickly and inefficiently consumes the available data rate of the frequencies.

There is a need in the art for systems and methods which use available frequencies more efficiently to deliver services to users. There is further a need for systems and methods which do not require additional cabling by the user for expanding services.

SUMMARY OF THE INVENTION

The present invention uses only one frequency per polarization on which to transmit additional services where previous services are being carried, rather than transmitting on all frequencies (e.g. sixty-four DIRECTV frequencies) as with a conventional DBS system. For example, if two polarizations are being used on two orbit locations, the present invention uses only four frequencies. This provides as much as 64/4 or 1600% of the data rate to send the data effectively to the IRD while allowing continuous data acquisition. In addition, the invention enables more advanced services which may require the use of multiple frequencies and the addition of new tuners, but without additional cabling.

A typical system of the present invention comprises a first splitter having an input, a first output and a slaved output receiving a first signal at the input having a single polarization including a first service and a slaved service, wherein the first signal is directed to the first output and the slaved output and selected by a first control signal applied at the input, a first tuner receiving the first output and tuning the first service and a slaved tuner receiving the slaved output and tuning the slaved service. A typical method of the present invention comprises generating a first control signal to select a first signal, receiving a first signal including a first service and a slaved service, wherein the first service and the slaved service are at the same polarization, splitting the first signal with a first splitter to a first output and a first slaved output, tuning the first service from the first output with a first tuner and tuning the slaved service from the slaved output with a slaved tuner.

The invention allows a broadcaster to send an 'always on' service to the receiver without having to carry that service on every system frequency or an additional cable from the LNB. This is done in two steps. The broadcaster transmits the service on at least one frequency of both polarizations of every satellite and the IRD has one tuner and transport demodulation hardware available to tune and digitally process the appropriate frequency of the service. Alternatively, the broadcaster may elect to broadcast the multiple services on the same polarization, but at different frequencies. This allows access to multiple services or a service requiring multiple frequencies, with multiple tuners and only a single cable to support all services.

With this invention, the LNB output is split internally to the IRD and a second dedicated tuner is used to acquire the supplementary services in addition to other user demanded services acquired by a first tuner, regardless of the first tuner's frequency selection and the LNB's polarization output.

The present invention has direct applicability to adding services, applications and user-interactive products receiving programming from satellite service providers, such as DIRECTV, without increasing the cables running form the dish to the receiver.

BRIEF DESCRIPTION OF THE DRAWINGS

Referring now to the drawings in which like reference numbers represent corresponding parts throughout:

FIG. 5 illustrates a secondary service lookup table with rate information;

FIGS. 6A–6B satellite spectrum and capacity for typical embodiments.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

System Overview

Figure 1:
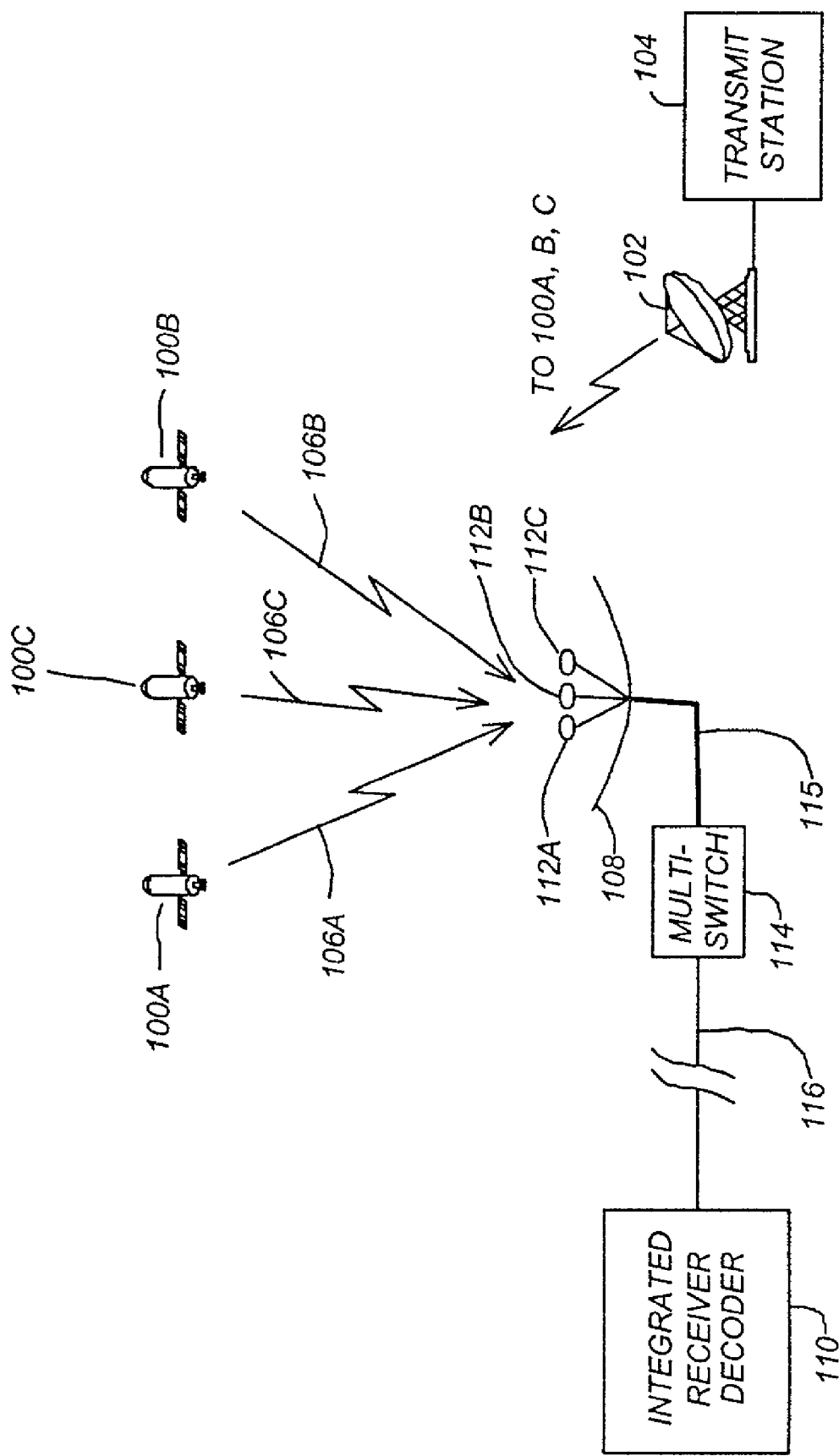
FIG. 1 is a diagram illustrating an overview of a multiple satellite video distribution system according to a typical embodiment of the present invention.

FIG. 1 is a diagram illustrating an overview of a multiple satellite video distribution DBS system according to a typical embodiment of the present invention. The system includes multiple satellites 100A–100C, uplink antenna 102, and transmit station 104. In a typical embodiment, the three satellites 100A–100C are in three different orbital slots located at 101 West Longitude (WL) 100A, 119 WL 100B, and 110 WL 100C, wherein the video programming signals 106A–106C are transmitted from transponders 1–32 on 101 WL 100A, transponders 22–32 on 119 WL 100B, and transponders 28, 30 and 32 on 110 WL 100C. The radio frequency (RF) signals 106A–106C (which may each include different polarizations) are received at one or more outdoor units (ODUs), which comprise user receiving station downlink antennas 108. Each downlink antenna 108 uses one or more LNBs 112A–112C (typically one for each satellite) and is coupled to one or more integrated receiver-decoders (IRDs) 110 for the reception and decoding of video programming signals 106A–106C. A multi-switch 114 may be used to select which LNB signal is directed to the IRD 110. Such an arrangement typically requires only a single cable to run from the multi-switch 114 to the IRD 110. IRDs use one cable per satellite tuner.

In a typical DBS system, the orbital locations of the satellites 100A–100C are chosen so that the signals 106A–106C, respectively received from each satellite 100A–100C, can be distinguished by the antenna 108, but close enough so that all signals 106A–106C can be received without physically slewing the axis of the antenna 108. When the user selects program material broadcast by the satellites 100A–100C, the IRD 110 electrically switches LNBs 112 to receive the respective broadcast signals 106A–106C from the satellites 100A–100C transmitting the broadcast signals 106A–106C and configures the selecte LNB for the proper polarization of the broadcast signals. This electrical switching may occur using a multiplexing switch (also known as a multiswitch).

Cables 115 connect the optional multiswitch to the LNBs 112A–112C. When the multiswitch is present, there is typically one cable 115 per polarization per satellite. Cables 116 connect the IRD to the optional multiswitch. There is one cable 116 per IRD satellite tuner. When no multiswitch is employed, cable 115 is omitted and cables 116 would connect directly to the LNBs 112A–112C.

Figure 2:
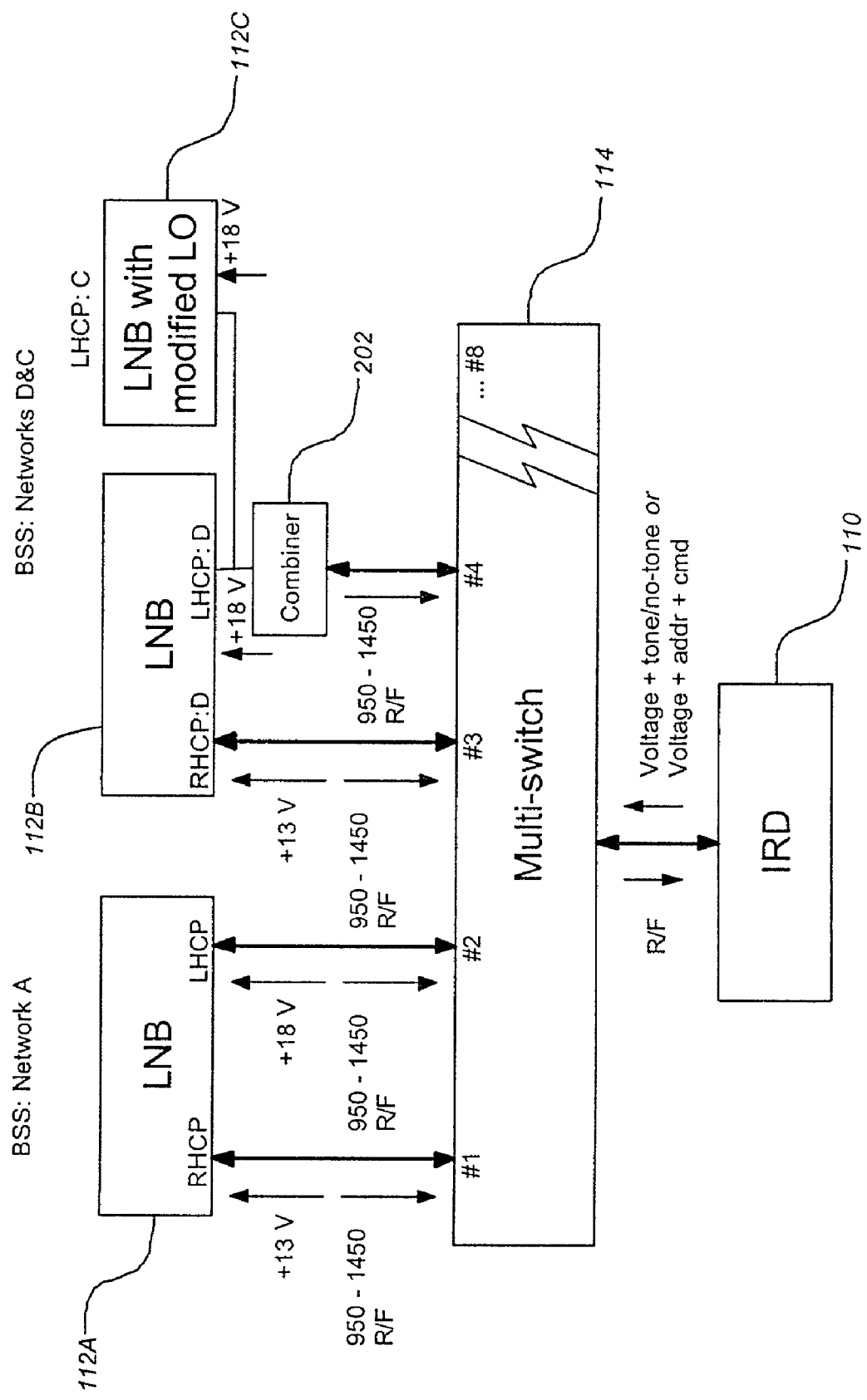
FIG. 2 is a diagram illustrating the operation of a multi-switch in the present invention.

FIG. 2 illustrates the operation of a combiner 138 and multi-switch 140 arrangement. The combiner 138 and multi-switch 140 arrangement is described in detail in co-pending and commonly-assigned Application Ser. No. 09/675,526, filed Sep. 29, 2000, by Dipak M. Shah, and entitled "AGGREGATED DISTRIBUTION OF MULTIPLE SATELLITE TRANSPONDER SIGNAL FROM A SATELLITE DISH ANTENNA," and Ser. No. 09/675,526, filed on Sep. 29, 2000, by Kesse C. Ho, and entitled "LOW NOISE BLOCK DOWN CONVERTER ADAPTER WITH BUILT-IN MULTI-SWITCH FOR A SATELLITE DISH ANTENNA," which applications are incorporated by reference herein. In the preferred embodiment, the combiner 138 and multi-switch 140 are housed within the Adapter 130, although other embodiments could mount these components in any location.

The 12.2–12.7 GHz signals 106A–106C received from the satellites 100A–100C pass through a feed horns of the LNBs 112A–112C and are down converted by a local oscillator and multiplier in the LNBs 112A–112C to the 950–1450 MHz signals required by a tuner/demodulator of the IRDs 110. Left and right polarized signals and are output from the LNBs 112A–112C.

The local oscillator and multiplier in the LNB 112C for 110 WL 100C are used to relocate the channels for 110 WL 100C for the purposes of the present invention. Specifically, the local oscillator and multiplier in the LNB 112C for 110 WL 100C relocates the three channels received from 110 WL 100C into unused positions within the assigned 950–1450 MHz spectrum of 119 WL 100B (in one example, channels 28, 30, and 32 are relocated to channels 8, 10, and 12). The combiner 202 masks the unused 119 WL 100B channels and combines the relocated 110 WL 100C channels with the assigned 950–1450 MHz spectrum of 119 WL 100B. Specifically, the combiner 202 sums the relocated channels from 110 WL 100C with the channels received from 119 WL 100B (in one example, relocated channels 8, 10, and 12 from 110 WL 100C are summed with channels 22–32 from 119 WL 100B) within the assigned 950–1450 MHz spectrum.

Those skilled in the art will note that the channel assignments provided above are merely illustrative, and that any desired channel arrangement could be used by proper selection of the local oscillator frequency. Moreover, those skilled in the art will recognize that channels from more than two signal polarizations could be relocated and aggregated using the present invention, with the use of additional or different combiners, oscillators, and multipliers.

This summed output from the combiner 202 is then provided to a single input of the multi-switch 114. The multi-switch 114 generally comprises a cross-bar switch, wherein any of the outputs can be connected to any of the inputs. The selection of which input to connect to a desired output via the multi-switch 140 is controlled by a signal received on the coaxial cable from the IRD 110, in a manner well known in the art (e.g., an 18V, 13V, 18V/22 kHz, or 13V/22 kHz signal from the IRD 110 selects one of the four inputs to the multi-switch 114).

Thus, the combiner 202 aggregates the signals 106B and 106C received from satellites 100B and 100C before the multi-switch 114 in order to decrease the number of inputs needed on the multi-switch 114. Consequently, a four-input multi-switch 114 can be used to select among five different signals output from three different LNBs 112 based on three different sets of signals 106A–106C received from transponders on three different satellites 100A–100C. Moreover, fewer sets of cables 116 are required and the polarization switching requirements for the LNBs 112, multi-switch 114, and IRDs 110 are simplified, thereby resulting in significant savings in component and installation costs.

Although the invention is described herein with respect to three satellites, those skilled in the art will understand that any number of satellites may be used and further, that any suitable platform may be used, including ground-based or high-altitude platforms. The only requirement is that the system must deliver multiple signals or multiple polarizations to the antenna 108.

Receiver Embodiments

Figure 3A:
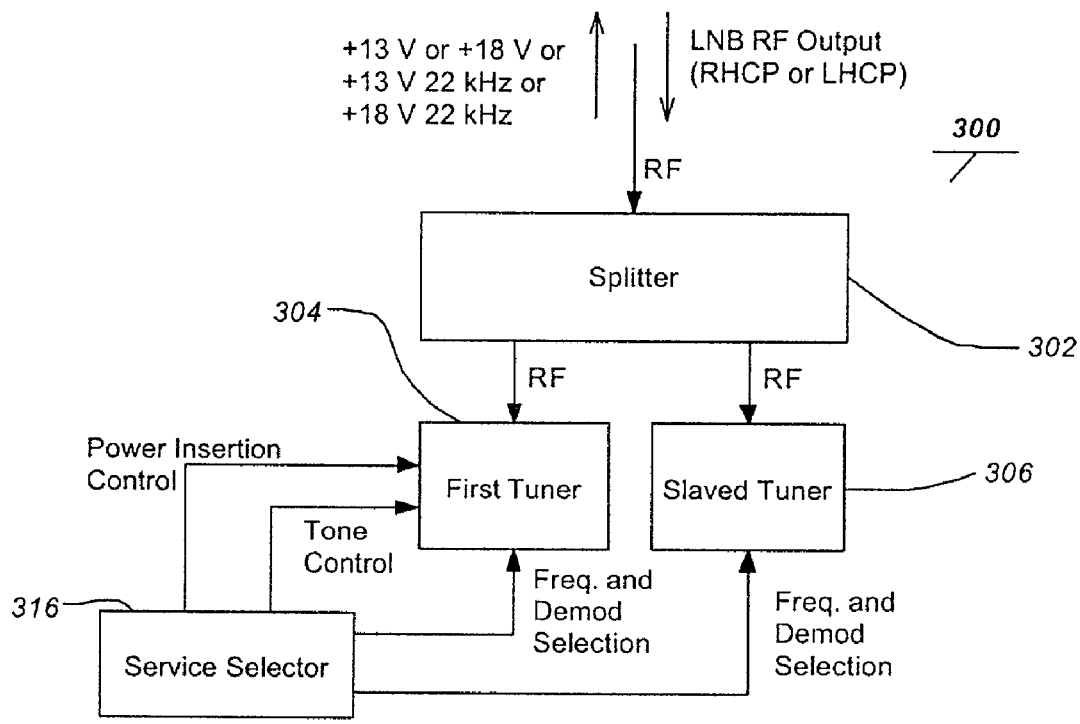
FIGS. 3A–3C illustrate some typical receiver embodiments of the present invention.
Figure 3B:
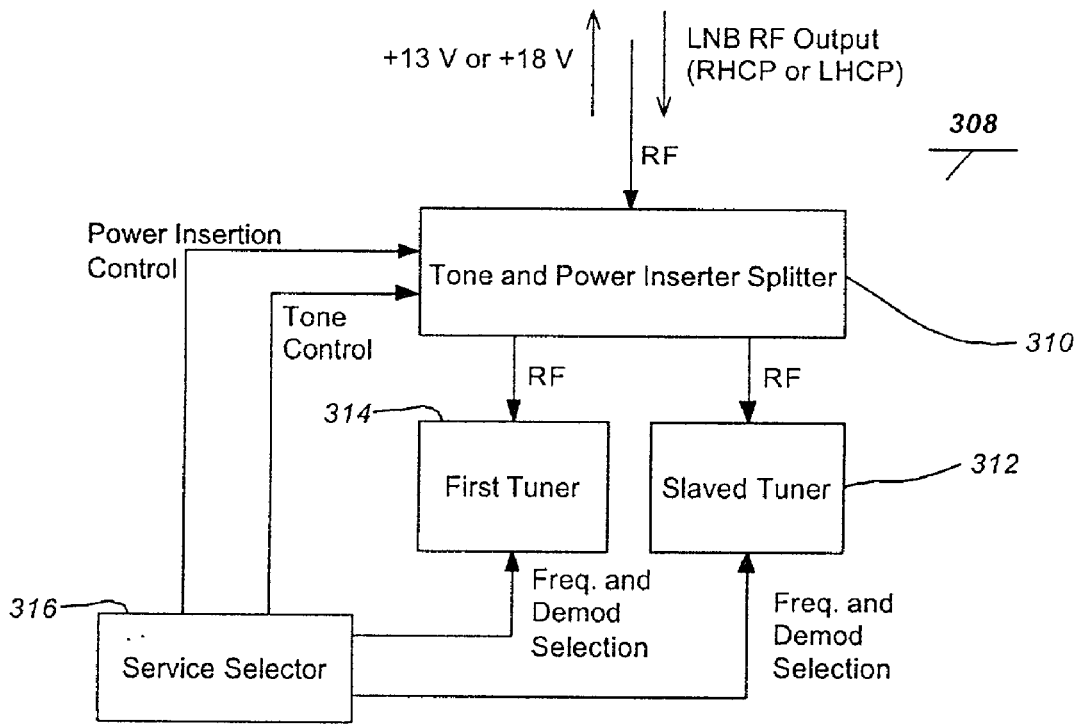
Figure 3C:
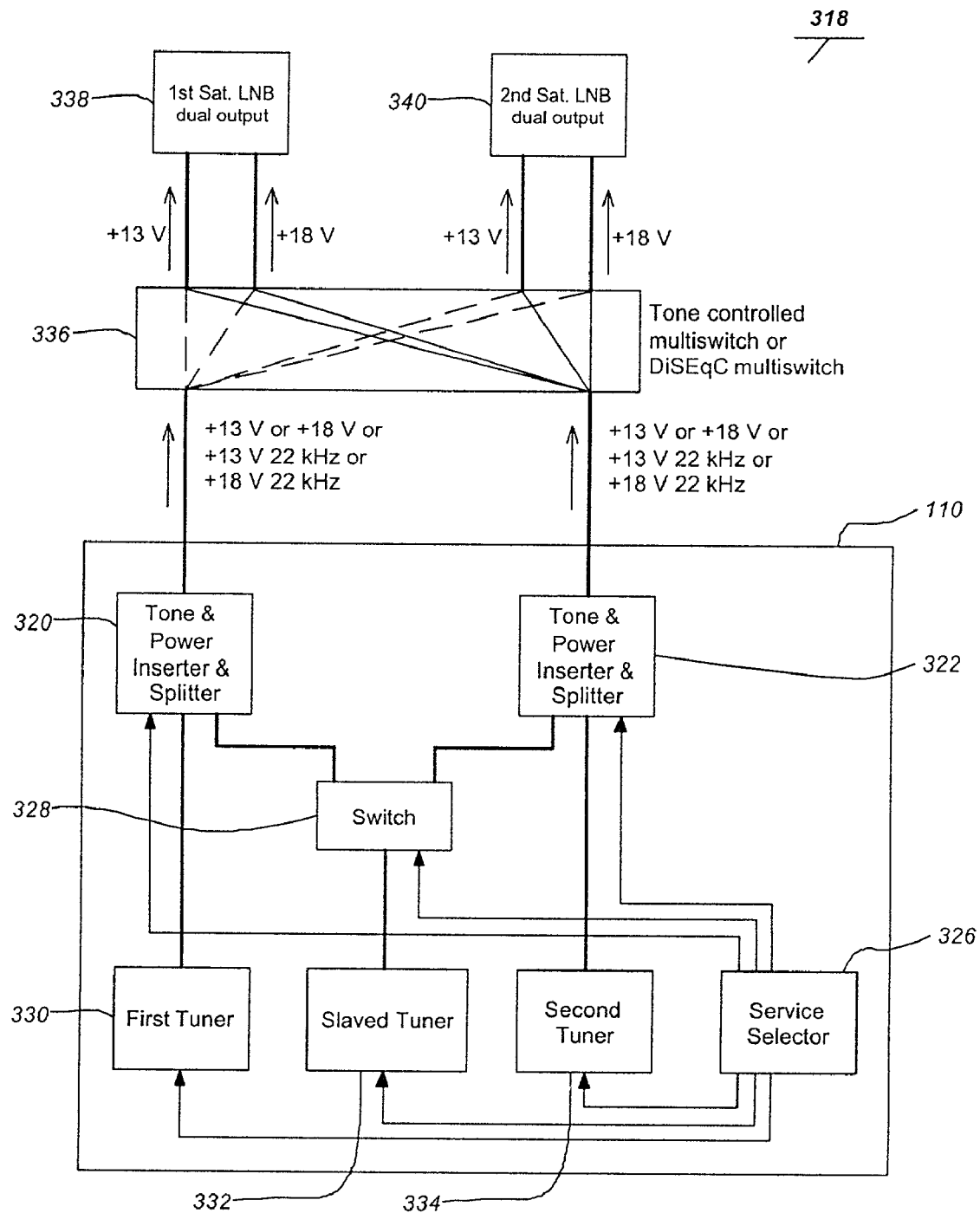

FIGS. 3A–3C illustrate some typical receiver embodiments of the present invention. FIG. 3A depicts a receiver 300 wherein the power insertion and tone controls are emitted by a first tuner 304, which includes a transport demodulator. The splitter 302 passes the power insertion and tone controls through to control a multiswitch, which operates as previously described. FIG. 3B depicts a receiver 308 wherein the power insertion and tone controls are emitted by the splitter 310. In either embodiment, the first tuner 304, 314 is used to tune a first service and a slaved tuner 306, 312, which also includes a transport demodulator, simultaneously tunes a slaved service. The first tuner 304, 314 acquires a first frequency and polarization of a selected signal from one of the satellites 100A–100C for a first service, such as a channel including a video and audio portion. The polarization of the first service determines the polarization output by the LNB. A service selector 316, which includes a polarization controller, controls the splitter 302 (or first tuner 314) to issue either 13V or 18V so that the proper polarization is obtained for the first service. The slaved tuner 306, 312 acquires the slaved frequency for a second service based upon the selected polarization and signal. In this manner the slaved tuner is slaved off the selection of the first tuner. Regardless of the first frequency's polarization, in that same polarization the same frequency or a second frequency will exist that provides the slaved service. Note that other equivalent methods of power insertion and tone control will be apparent to those skilled in the art and the invention should not be limited to the examples provided. The invention can also be expanded to additional tuners in a similar fashion without requiring additional cables.

FIG. 3C depicts an example receiver 318 using two primary and one slaved tuner. Such an arrangement may be employed for example in an application where a user views a program on one of the primary receivers while recording a program on the other primary receiver. In a typical embodiment, there are two splitters 320, 322 inside the IRD 324 for each RF input which separately receive signals, either directly from an LNB or optionally through a multi-switch. Which signal is received by each splitter 320, 322 depends separately upon the power and tone controls applied as previously discussed by a service selector 326. Although FIG. 3C depicts the power and tone controls applied through the splitters 320, 322, the controls may also be applied via the first and second tuners 330, 334, similar to the embodiment of FIG. 3A. The slaved tuner 334 is then able to tune the slaved frequency which carries the slaved services and demodulate it to utilize the slaved service's data contents. A switch 328 may be used to alternately slave the slaved service off the first tuner's service or the second tuner's service (based on speed or other considerations).

It is important to understand that each of the tuners (first, second and slaved) may receive content of the same or different classes. For example, the slaved tuner may receive a supplementary data service (such as a stock ticker), a music service, or a full video service. Similarly, the first and second receivers each may receive any type of service. The slaved tuner is only distinguished the fact that its accessible services are determined by the primary tuner to which it is currently slaved. The details of systems and methods for service selection are described hereafter.

Service Selection

In the case of a service which spans multiple frequencies on a single polarization, the initial polarization selection of the first tuner 304, 314, 330 determines access to the complete service. The present invention allows a satellite receiver 110 to tune and acquire data services from two or more frequencies simultaneously using only one cable from the multi-switch 114 and only one selected LNB 112 downconverter from the satellite dish 108.

The broadcast plan places the slaved service onto at least one frequency of each satellite's polarizations, for example on a frequency of both the RHCP and the LHCP per satellite. In so doing, the broadcaster guarantees that regardless of which satellite's signal 106 and which polarization is being tuned by the first tuner 304, 314, 330 to access the first service, that the selected LNB's 112 RF to the IRD 110 will carry at least one frequency that contains the data packets of the slaved service.

The first service changes frequencies per a user selection, and typically is used to acquire the video and audio programming for a user selected channel. Based on the frequency of the first service, the LNB is controlled to output the RF for a particular polarization, typically for a DBS service that would be either RHCP or LHCP.

Based on the transmitting satellite of the first service, the optional multi-switch selects the proper LNB to connect the IRD to a specific satellite's LNB. There may be one, two or more LNBs connected to a multi-switch.

The RF input to the IRD 110 that comes from the LNBs 112A–112C through the optional multi-switch 114 is then taken and split to a slaved tuner as shown in FIGS. 3A–3C and previously described. The slaved tuner 306, 310, 332 tunes a frequency for that given polarization that contains the first frequency. Control of the input to the IRD through the multi-switch 310 is directed through a combination of tone and power levels or by modulated tones and power levels (e.g. digital satellite equipment control (DiSEqC)) as previously described.

In one embodiment the SCID for the slaved service may be selected from the first or second frequency and utilized in a manner consistent and appropriate for that slaved service. Some example second services are conditional access card management, real-time stock tickers, caching data to the IRD for later use (such as for advertisements), software downloads/upgrades, fulfilling the user's earlier requests for data (such as HTML web pages).

Figure 4A:
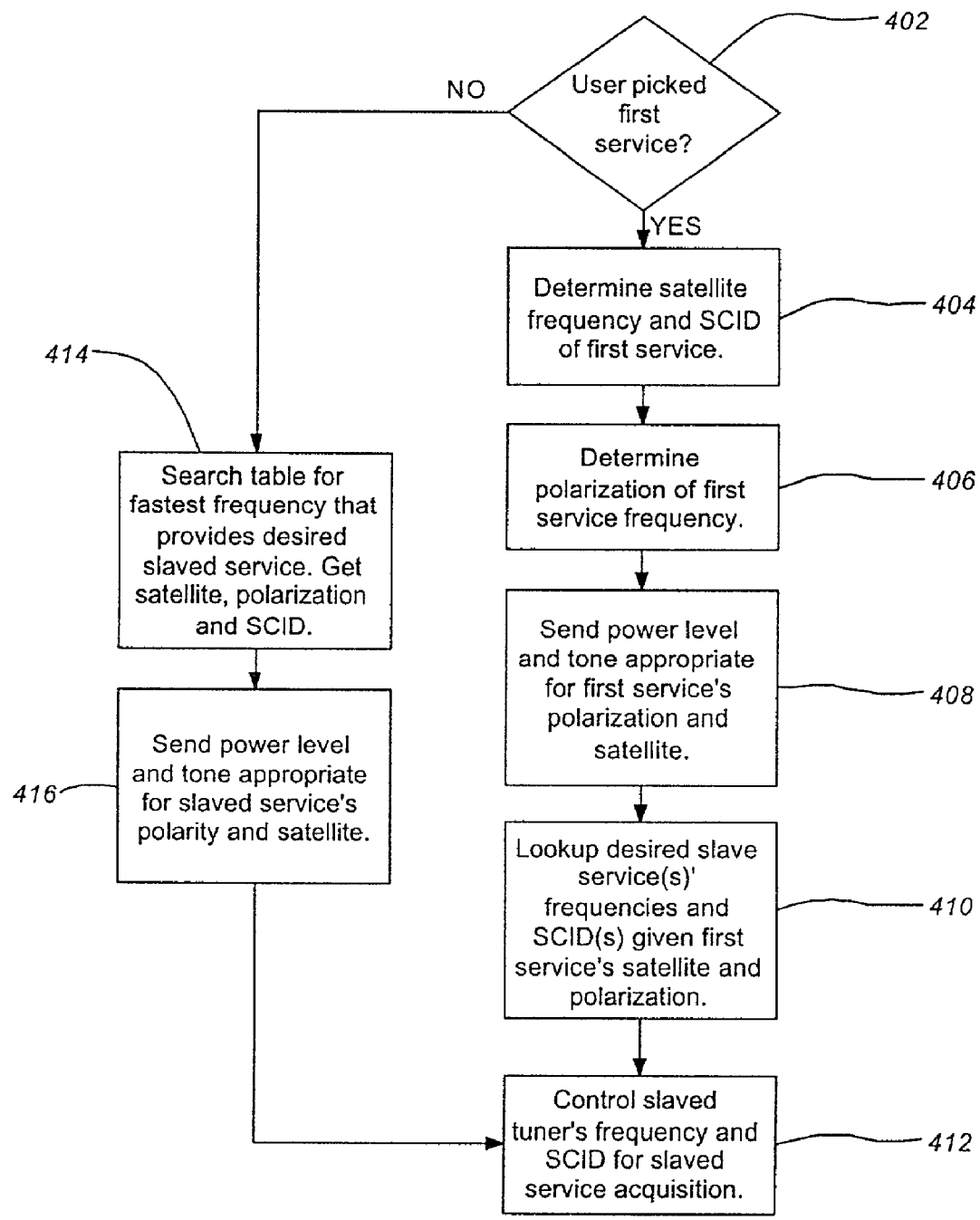
FIGS. 4A–4B illustrate logic flow for the present invention.
Figure 4B:
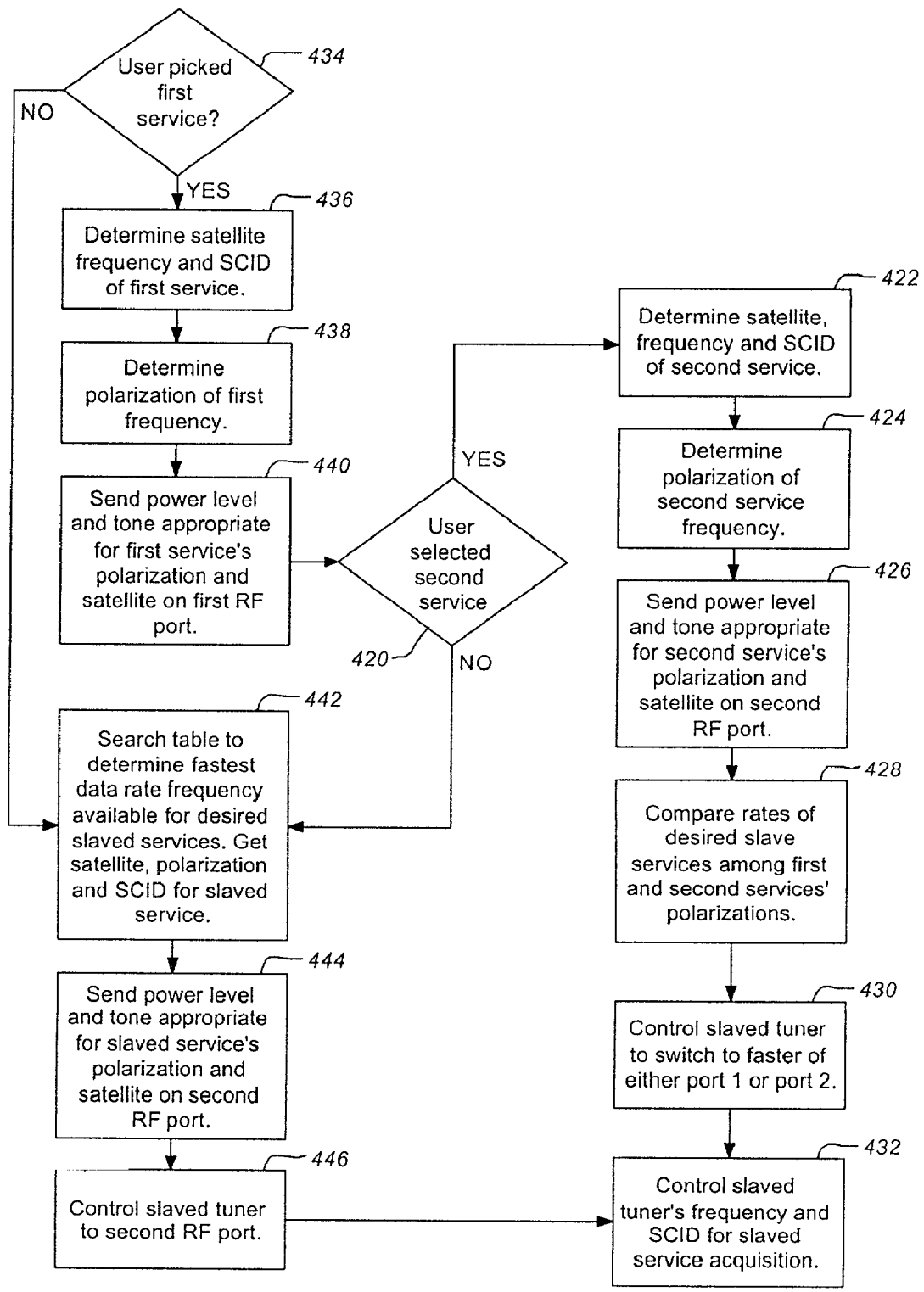

FIGS. 4A–4B illustrate logic flow for the present invention. Logic functions may be performed by the service selector 316 or 326. FIG. 4A describes the logic flow for typical embodiments of the present invention employing a single primary and slaved tuner, such as shown in FIGS. 3A and 3B. The process begins by determining whether the user has selected a first service 402. If a first service is selected, the satellite, frequency and service channel identification (SCID) of the first service are determined 404. Then the polarization of the first service is determined 406 and the appropriate power level and tone for the first selected first service's polarization and satellite is sent 408 (either through the first tuner 304 or the splitter 310, as appropriate). Next, a table lookup is performed for the desired slaved service(s)' frequency and SCID(s), given the first service's satellite and polarization 410. Finally, the slaved tuner 306, 312 is controlled for slaved service acquisition using the determined frequency and SCID 412. If a first service is not selected by the user, a table search is conducted for the fastest frequency that provides the desired slaved service to obtain the satellite, polarization and SCID 414. Then, the appropriate power level and tone are sent for the desired slaved service(s)' polarization and satellite 416. At this point the selected tuner 306, 312 is controlled for slaved service acquisition using the determined frequency and SCID 412.

FIG. 4B describes the logic flow for typical embodiments of the present invention employing two primary tuners 330, 334 and a slaved tuner 332, such as shown in FIG. 3C. The process begins with determining whether the user has selected a first service 434. If so, the satellite frequency and SCID of the first service are determined 436 and then the polarization of the first frequency is determined 436. Next, appropriate power level and tone for the first service's polarization and satellite is sent on a first RF port. From here the process determines whether the user has selected a second service 420.

If the user has not initially selected a first service at the prior step 434 or not selected a second service at step 420, a table search is performed to determine the fastest data rate frequency available for the desired slaved services and the satellite, polarization and SCID for the desired slaved service are determined 442. At this point, the appropriate power and tone for the desired slave service's polarization and satellite is sent on a second RF port 444. Next, the slaved tuner is controlled to the second RF port 446. Finally, the slaved tuner's frequency and SCID are controlled for slaved service acquisition 432.

However, if the user has selected a second service in the prior step 420, the process instead determines the satellite, frequency and SCID of the selected second service 422 and the polarization of the second service frequency is determined 424. Next, the appropriate power level and tone for the second service's polarization and satellite is sent on the second RF port 426. Following this, data rates of the desired slave services are compared among the first and second services' polarizations 428. The slave tuner is then controlled to switch to the fastest port 430. As before, the slaved tuner's frequency and SCID are then controlled for slaved service acquisition 432.

FIG. 5 illustrates a secondary service lookup table with rate information. Based on the satellite and polarization desired by the first tuner 304, 314, 330, such a table provides the IRD 110 a lookup to acquire the desired slaved services using the slaved tuner. If the receiver uses two satellite inputs (e.g. as in FIG. 3C), rate information is used to select the faster of available slaved service signals to the slaved tuner.

A further aspect of the present invention involves the manner in which services may be selected in the absence of specific direction by the user. The IRD may also utilize an algorithm or intelligent agent which examines all services available to the slaved tuner from either the first or second tuner (if available) and selects and processes the services it deems preferred. Of course, such an algorithm may also be used for the primary tuners if the user has not selected a service for them. This selection may be based on preset criteria determined by the broadcaster for all IRDs or may be customized by parameters associated with the user (e.g., subscription package), preferences set by the user, user profile created by the IRD to characterize the preferences of the user, or any combination of the above.

To elaborate, such an algorithm to determine the selected service may be either incorporated into the IRD or used by the broadcaster (at the transmission station 104, for example) with the result communicated to the IRD. Many possible factors may be used to determine the selected service. The functional capabilities of the IRD are one such factor. For example, if a surround sound transmission is available but the IRD is incapable of receiving such a transmission, that service will not be selected. Another factor may be user preferences which are input into the IRD or communicated to the broadcaster. If the user has indicated that she is a fan of country music, the selected service may be a country music service, for example. The user preferences may also be determined by monitoring the selection habits of the user. Preferences determined through monitoring may be communicated to the broadcaster or performed by an automated process entirely within the IRD to maintain user privacy. Finally, the user's account information may also be used to select the service.

FIGS. 6A–6B satellite spectrum and capacity for typical embodiments. Because the user is still free to select the first service randomly, the acquisition of the slaved service's data is non-interfering to the user's demands. The data is downloaded transparently. The slaved tuner of the IRD is provided the slaved service's frequency from a table. FIG. 6A is a table showing the transponder location of slaved services for a slaved tuner. Optimally, all slaved services would co-exist on one frequency per polarization. This allows parallel access to all or any slaved service without restriction. If restrictions are permissible, two or more frequencies may carry multiple slaved services per polarization. FIG. 6B is a table showing the transponder locations of slaved services where three alternative slaved services are available. In this case, the slaved services, A, B and C, are mutually exclusive. The service information may be provided to the IRD and used through a number of possible mechanisms. Some illustrative examples follow.

For each satellite and polarization the table may list one or more frequencies for the carrier signals for the slaved services. The IRD then looks up the satellite and polarization of the currently tuned first service and determines the frequency for the slaved service. The IRD stores this table and responds to any changes within it. In addition, a default table may be stored in a memory, such as a flash memory from the factory manufacturing process.

Alternately, the table may be additional information added and associated with the channel information that is used to describe the services of every first service or channel. This additional information describes the frequencies for the carrier signals for the slaved data services. This table may also be updateable as in the previous example.

Another scheme may provide the table as information to the user, such as in the form of a mailer, and require that the user input the appropriate information in a user interface, part of the IRD program guide or menu system.

A dial up service may also be used to feed the information to the IRD. The IRD could be automated to call the dial-up server periodically or sent a message from the broadcast instructing it to call up to load a new table.

Using the table information, the second tuner is then tuned to that frequency. If no service is found, the next appropriate frequency is tried, and so on, until the slaved service is found or all frequencies are exhausted.

The user may sign up for slaved services, such as stock tickers, using IRD supplied forms and user interfaces. The broadcaster may also download a table of contents of the available slaved services, which the user then interacts with through a user interface to select desired slaved services.

The broadcaster may also instruct the IRD to monitor other slaved services, such as software downloads and advertisement caching. In addition, some user selected slaved services might cause other slaved services to become monitored that the user did not directly select.

This concludes the description including the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for receiving a slaved service, comprising:
    a first splitter having an input, a first output and a slaved output, the first splitter receiving a first signal at the input having a single polarization and including a first service and a slaved service, wherein the first signal is directed to the first output and the slaved output and is selected by a first control signal applied at the input;
    a first tuner receiving the first output and tuning the first service;
    a slaved tuner receiving the slaved output and tuning the slaved service; and a service selector for directing the tuning of the first tuner and the slaved tuner and for producing the first control signal; and wherein the first control signal is applied at the input, which is produced from the service selector through the first tuner and the first splitter.

2. The system of claim 1, wherein the slaved service is selected from a plurality of slaved services.

3. The system of claim 1, further comprising:
a second splitter having a second input, a second output and a second slaved output, the second splitter receiving a second signal at the second input having a single polarization including a second service and the slaved service, wherein the second signal is directed to the second output and the second slaved output selected by a second control signal applied at the second input; and
a second tuner, receiving the second output of the second splitter and the second service of the second signal;
a switch for selectably providing one of the slaved output of the first splitter and the second slaved output of the second splitter to the slaved tuner.

4. The system of claim 3, further comprising a service selector for directing tuning of the first tuner, the second tuner and the slaved tuner, for producing the first and second control signals, and for commanding the switch.

5. The system of claim 4, wherein the first control signal is applied by the selector to the first splitter and the second control signal is applied by the selector to the second splitter.

6. The system of claim 4, wherein the first control signal is applied by the selector through the first tuner through the first splitter and the second control signal is applied by the selector through the second tuner through the second splitter.

7. The system of claim 1, wherein the system is integral to an integrated receiver/decoder (IRD).

8. The system of claim 1, further comprising a table providing a slaved frequency of the slaved service based upon the signal and polarization.

9. The system of claim 8, wherein the table is stored in a memory.

10. The system of claim 9, wherein the memory is updated.

11. The system of claim 9, wherein the memory is a flash memory including a default table.

12. The system of claim 8, further comprising channel information for the first service and wherein the table is additional information associated with the channel information.

13. The system of claim 8, wherein the table is provided as information to a user and the user inputs information.

14. The system of claim 8, wherein the table is provided from a dial-up service.

15. The system of claim 14, wherein the system periodically calls the dial-up service.

16. The system of claim 14, wherein the system is prompted to call the dial up server from the signal.

17. The system of claim 1, wherein at least one tuned service is selected using an algorithm.

18. The system of claim 17, wherein the algorithm is performed within the receiver system.

19. The system of claim 17, wherein the algorithm is performed outside the receiver system and the selected service is communicated to the receiver system.

20. The system of claim 17, wherein the algorithm accounts for the capabilities of the receiver system to determine the selected service.

21. The system of claim 17, wherein the algorithm employs user preferences to determine the selected service.

22. The system of claim 21, wherein the user preferences are determined by the receiver system through monitoring user habits.

23. The system of claim 21, wherein the user preferences are determined with user account information.

24. The system of claim 21, wherein the user preferences are preselected by the user.

25. The system of claim 1, wherein the slaved tuner tunes services that are determined by the first tuner.

26. A method of receiving a slaved service, comprising:
generating a first control signal to select a first signal;
receiving the first signal including a first service and the slaved service, wherein the first service and the slaved service are at the same polarization;
splitting the first signal with a first splitter to a first output and a first slaved output;
tuning the first service from the first output with a first tuner;
tuning the slaved service from the slaved output with a slaved tuner;
generating a second control signal to select a second signal;
receiving the second signal including a second service and the slaved service;
splitting the second signal with a second splitter to a second output and a second slaved output;
selecting an input to the slaved tuner between the first slaved output and the second slaved output; and tuning the selected input to the slaved tuner to receive the slaved service.

27. The method of claim 26, further comprising directing the tuning of the first tuner, the slaved tuner and generating first control signal.

28. The method of claim 26, further comprising selecting the slaved service from a plurality of slaved services.

29. The method of claim 26, further comprising directing tuning of the first tuner, and the slaved tuner, producing the first and second control signals, and selecting the input to the slaved tuner.

30. The method of claim 29, wherein directing includes applying the first control signal to the first splitter and the second control signal to the second splitter.

31. The method of claim 29, wherein directing includes applying the first control signal through the first tuner through the first splitter and applying the second control signal through the second tuner through the second splitter.

32. The method of claim 26, wherein the method is integral to an integrated receiver/decoder (IRD).

33. The method of claim 26, further comprising using a table providing the slaved frequency of the slaved service based upon the single signal and polarization.

34. The method of claim 33, wherein the table is stored in a memory.

35. The method of claim 34, wherein the memory is updated.

36. The method of claim 34, wherein the memory is a flash memory including a default table.

37. The method of claim 33, further comprising channel information for the first service and wherein the table is additional information associated with the channel information.

38. The method of claim 33, wherein the table is provided as information to a user and the user inputs information.

39. The method of claim 33, wherein the table is provided from a dial-up service.

40. The method of claim 39, further comprising periodically calling the dial-up service.

41. The method of claim 39, wherein the signal prompts calling the dial up server.

42. The method of claim 26, wherein at least one tuned service is selected using an algorithm.

43. The method of claim 42, wherein the algorithm is performed within the receiver system.

44. The method of claim 42, wherein the algorithm is performed outside the receiver system and the selected service is communicated to the receiver system.

45. The method of claim 42, wherein the algorithm accounts for the capabilities of the receiver system to determine the selected service.

46. The method of claim 42, wherein the algorithm employs user preferences to determine the selected service.

47. The method of claim 46, wherein the user preferences are determined by the receiver system through monitoring user habits.

48. The method of claim 46, wherein the user preferences are determined with user account information.

49. The method of claim 46, wherein the user preferences are preselected by the user.

50. The method of claim 26, wherein the slaved service provides services that are determined by the first service.

51. A system for transmitting a slaved service, comprising:
at least one transmit station having an uplink antenna transmitting a first signal including a first service and a slaved service at the same polarization; and
at least one satellite receiving and retransmitting the first signal to a downlink antenna;
wherein the first signal is communicated to a first splitter having a first input, a first output communicated to a first tuner for tuning the first service, and a first slaved output communicated to a slaved tuner for tuning the slaved service and the first signal is selected by a first control signal applied at the first input; and wherein:
the at least one transmit station transmits a second signal including a second service and the slaved service at the same polarization, the at least one satellite receives and retransmits the second signal to the downlink antenna and the second signal is communicated to a second splitter; the second splitter having a second input, a second output communicated to a second tuner for tuning the second service, and a second slaved output communicated to the slaved tuner for tuning the slaved service; and the second signal is selected by a second control signal applied at the second input and output to the slaved tuner is selected between the first and second slaved outputs.

52. The system of claim 51, wherein at least one tuned service is selected using an algorithm.

53. The system of claim 52, wherein the algorithm is performed within the receiver system.

54. The system of claim 52, wherein the algorithm is performed outside the receiver system and the selected service is communicated to the receiver system.

55. The system of claim 52, wherein the algorithm accounts for the capabilities of the receiver system to determine the selected service.

56. The system of claim 52, wherein the algorithm employs user preferences to determine the selected service.

57. The system of claim 56, wherein the user preferences are determined by the receiver system through monitoring user habits.

58. The system of claim 56, wherein the user preferences are determined with user account information.

59. The system of claim 56, wherein the user preferences are preselected by the user.

60. A method of a slaved service, comprising:
transmitting a first signal including a first service and the slaved service at the same polarization; and
receiving and retransmitting the first signal to a downlink antenna;
wherein the first signal is communicated to a first splitter having a first input, a first output, and a first slaved output, the first output provided to a first tuner for tuning the first service and the first slaved output provided to a slaved tuner for tuning the slaved service, the first signal selected by a first control signal applied at the first input; and
wherein the at least one transmit station transmits a second signal including a second service and the slaved service at the same polarization; the at least one satellite receives and retransmits the second signal to the downlink antenna and the second signal is communicated to a second splitter; the second splitter having a second input, a second output communicated to a second tuner for tuning the second service, and a second slaved output communicated to the slaved tuner for tuning the slaved service; and the second signal is selected by a second control signal applied at the second input and output to the slaved tuner is selected between the first and second slaved outputs for providing the slaved service.

61. The method of claim 60, wherein at least one tuned service is selected using an algorithm.

62. The method of claim 61, wherein the algorithm is performed within the receiver system.

63. The method of claim 61, wherein the algorithm is performed outside the receiver system and the selected service is communicated to the receiver system.

64. The method of claim 61, wherein the algorithm accounts for the capabilities of the receiver system to determine the selected service.

65. The method of claim 61, wherein the algorithm employs user preferences to determine the selected service.

66. The method of claim 65, wherein the user preferences are determined by the receiver system through monitoring user habits.

67. The method of claim 65, wherein the user preferences are determined with user account information.

68. The method of claim 65, wherein the user preferences are preselected by the user.

69. The system of claim 51, wherein the slaved service provides services that are determined by the first service.

70. The method of claim 60, wherein the slaved service provides services that are determined by the first service.

71. A system for receiving continuous services, comprising:
a first splitter having a first input, a first output and a first slaved output, the first splitter receiving a first signal at the first input having a single polarization and including a first service and a first slaved service, wherein the first signal is directed to the first output and the first slaved output and is selected by a first control signal applied at the first input;
a first tuner receiving the first output and tuning the first service;
a slaved tuner receiving the first slaved output and tuning the first slaved service;

a second splitter having a second input, a second output and a second slaved output, the second splitter receiving a second signal at the second input having a single polarization including a second service and the slaved service, wherein the second signal is directed to the second output and the second slaved output and selected by a second control signal applied at the second input;

a second tuner, receiving the second output of the second splitter and the second service of the second signal; and a switch for selectably providing one of the slaved output of the first splitter and the second slaved output of the second splitter to the slaved tuner.

72. The system of claim 71, further comprising a service selector for directing tuning of the first tuner, the second tuner and the slaved tuner, for producing the first and second control signals, and for commanding the switch.

73. The system of claim 72, wherein the first control signal is applied by the selector to the first splitter and the second control signal is applied by the selector to the second splitter.

74. The system of claim 72, wherein the first control signal is applied by the selector through the first tuner through the first splitter and the second control signal is applied by the selector through the second tuner through the second splitter.

75. The system of claim 71, wherein the system is integral to an integrated receiver/decoder (IRD).

76. The system of claim 71, further comprising a table providing a slaved frequency of the slaved service based upon the signal and polarization.

77. The system of claim 76, wherein the table is stored in a memory.

78. The system of claim 77, wherein the memory is updated.

79. The system of claim 77, wherein the memory is a flash memory including a default table.

80. The system of claim 76, further comprising channel information for the first service and wherein the table is additional information associated with the channel information.

81. The system of claim 76, wherein the table is provided as information to a user and the user inputs information.

82. The system of claim 76, wherein the table is provided from a dial-up service.

83. The system of claim 82, wherein the system periodically calls the dial-up service.

84. The system of claim 82, wherein the system is prompted to call the dial up server from the signal.

85. The system of claim 71, wherein at least one tuned service is selected using an algorithm.

86. The system of claim 85, wherein the algorithm is performed within the receiver system.

87. The system of claim 85, wherein the algorithm is performed outside the receiver system and the selected service is communicated to the receiver system.

88. The system of claim 85, wherein the algorithm accounts for the capabilities of the receiver system to determine the selected service.

89. The system of claim 85, wherein the algorithm employs user preferences to determine the selected service.

90. The system of claim 89, wherein the user preferences are determined by the receiver system through monitoring user habits.

91. The system of claim 89, wherein the user preferences are determined with user account information.

92. The system of claim 89, wherein the user preferences are preselected by the user.

* * * * *